United States Patent Office 3,591,574
Patented July 6, 1971

3,591,574
TRI-N-PHENYLGLYCYL DERIVATIVES OF INSULIN
Richard L. Fenichel, Wyncote, Norman H. Grant, Wynnewood, and Harvey E. Alburn, West Chester, Pa., assignors to American Home Products Corporation, New York, N.Y.
No Drawing. Filed May 29, 1968, Ser. No. 732,812
Int. Cl. A61r 17/02; C07c 103/52
U.S. Cl. 260—112.7                              2 Claims

ABSTRACT OF THE DISCLOSURE

Acyl-substituted-insulins, particularly phenyl- and substituted-phenylglycyl-insulins, especially N-phenylglycyl-insulin, N-p-methylphenylglycyl-insulin and N-p-chlorophenylglycyl-insulin (I), are prepared by treating insulin with an acylating agent, especially the corresponding N-chloroformyl-N-phenyl or substituted-phenylglycin (II). The new compounds (I) have hypoglycemic activity and are useful to treat diabetes, especially in subjects who are insulin fast.

---

This invention relates to derivatives of insulin which have therapeutic activity, and to methods for using them. More particularly, it relates to an acyl-substituted, particularly phenyl- and substituted-phenylglycyl-insulins, and especially N-phenylglycyl-insulin, N-p-methylphenylglycyl-insulin, and N-p-chlorophenylglycyl-insulin with blood sugar lowering activity.

BACKGROUND OF THE INVENTION

The use of insulin as an agent to lower blood sugar and control diabetes is a matter of common knowledge and experience. However, insulin itself is unstable and dosage forms containing it must be kept under refrigeration and stabilized by the addition of materals whch can cause adverse side reactions in some susceptible individuals. Furthermore, insulin has a rather short duration of action, of only about six to eight hours, requiring multiple administration during the day. The insulin hormone has been modified by forming derivatives thereof, such as zinc complexes, protamine zinc complexes, and the like; and these do indeed provide longer durations of activity, but they are difficult to manufacture because particle size controls the duration of activity, and difficult to use, because it is essential to disperse the active material before administration. In addition, numerous instances are known of diabetic subjects not readily maintained on regular doses of present forms of insulin. Some subjects, described herein as "insulin fast diabetics" develop what appears to be an insulin resistance. This is overcome by administration of unusually high doses of the present types of insulin. The resistance appears to result from the development of antibodies which seem to inactivate the present type of insulin. Thus a need exists for forms of insulin which are highly effective as hypoglycemic agents in the treatment of diabetes; which have long durations of activity coupled with quick onsets of action; which are well tolerated by the subject; and which are less antigenic than the present types of insulin. Such compounds are now provided by this invention.

DESCRIPTION OF THE INVENTION

The compounds of this invention are, in essence: an acyl-substituted-insulin wherein the said acyl group is N-phenylglycyl, N-p-methylphenylglycyl or N-p-chlorophenylglycyl, i.e, a group of the formula:

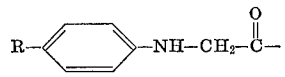

wherein R is hydrogen, methyl or chloro, respectively.

Special mention is made of a preferred embodiment. This is N-phenylglycyl-insulin, wherein R in said acyl group is hydrogen.

Also contemplated by the instant invention is a method for treating diabetes, which comprises administering to an insulin fast diabetic from about 1 to about 200 units of an acyl-substituted insulin wherein said acyl group is as above defined.

A preferred embodiment is a method as above defined wherein said acyl-substituted-insulin is N-phenylglycyl-insulin.

The new acyl-substituted insulins (I) of the present invention can be prepared by numerous procedures known in the art of peptide synthesis. All comprise, in general, reacting insulin with a derivative of an N-phenyl- or N-substituted-phenylglycine until acylation is substantially complete, and recovering said acyl-substituted insulin. Suitable derivatives of N-phenyl- or N-substituted-phenylglycine—all of which are prepared in accordance with techniques well known to those skilled in the art—include N-chloroformyl-N-phenyl- or substituted-phenylglycine; N-carboxy-N-phenyl- or substituted-phenylglycine anhydride; N-phenyl- or substituted-phenylglycine substituted with carbobenzoxy, triphenylmethyl or trifluoroacetyl blocking groups; derivatives such as the azide, acid chloride, mixed anhydride, active ester, and the like. Especially useful are the N-chloroformyl and the N-carboxyamino acid anhydride derivatives. Coupling may also be achieved by use of N,N'-disubstituted carbodiimides. A preferred route employs the N-chloroformyl derivatives as follows:

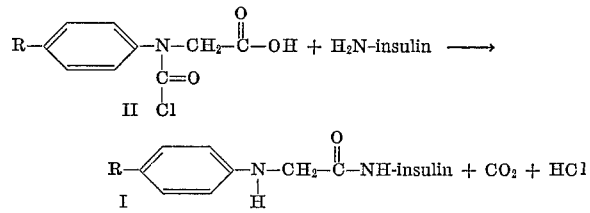

wherein R is as above defined.

The compounds of this invention of Formula II are those wherein all of the free amino groups in insulin have been substantially completely substituted by reaction with a reagent forming the acyl group. Expressly excluded are the O-acyl derivatives, which if they can be obtained at all must be formed by other procedures.

Those skilled in the art to which this invention pertains are well aware of the fact that insulin is a complex molecule with a relatively high molecular weight (about 6,000) and that each molecule of the hormone contains three free amino groups. [The Merck Index, eighth edition, April 1968, pages 567–568.] In aqueous solution at various pH levels, insulin polymerizes to form macromolecules (molecular complexes). [Martin, Remington's Practice of Pharmacy, thirteenth edition, Mack Publishing Co., Easton, Pa., 1965, pages 1045–1046.] At a pH of about 7.5 insulin exists as a tetramolecular complex and demonstrates an apparent or effective molecular weight of about 24,000, each such macromolecule (tetramolecular complex) contains twelve free amino groups at neutral pH [M. E. Krahl, "The Action of Insulin on Cells"; New York, Academic Press, page 160 (1961)]. These are the amino groups which can react with the acylating agent, for example, the N-phenylglycine derivatives of Formula II, and the instant compounds therefore contain about twelve acyl groups per macromolecule (tetramolecular complex at about pH 7.5) of insulin; i.e. which is about three acyl groups per molecule (molecular weight of about 6,000) of insulin.

More particularly, with reference to the structure of insulin, as disclosed, for example, by T. E. Prout in Metabolism, 12, 673 (1963), at page 674, the free amino-groups acylated according to this invention are those of glycine (in position A–1), phenylalanine (B–1) and lysine (B–29). Because of steric inhibitions, no acylation occurs in the guanidino group of arginine (B–22) and the imidazole rings of histidine (B–5 and B–10). Since at neutral pH, there are 4 basic units (each comprising one A-chain and one B-chain) associated per insulin macromolecule (tetramolecular complex), 12 primary amino groups, those of four (A–1) glycines, four (B–1) phenylalanines and four (B–29) lysines, are acylated in each macromolecule (tetramolecular complex) of the instant compounds, i.e. 3 primary amino groups, those of one (A–1) glycine, one (B–1) phenylalanine and one (B–29) lysine, are acylated in each molecule of insulin (molecular weight of about 6,000).

Moreover, those skilled in the art consider the ninhydrin reaction to be one of the best possible tests for the presence of primary amino groups. When the instant insulins, including N-phenylglycyl insulin, are tested with ninhydrin in comparison with bovine insulin (sham treated insulin) the sham insulin gives a positive ninhydrin test while the modified insulins give a negative ninhydrin reaction. During the course of this test all of the insulins are boiled for 2 minutes with the ninhydrin reagent. N-phenylglycyl insulin, in contrast to many other derivatives of insulins does not flocculate during this test, and the solution remains absolutely clear. The absence of a positive ninhydrin reaction with the instant modified insulins is considered to be good evidence for the blocking or covering of primary amino groups.

The insulin used herein can be from any of the usual sources, commonly employed. For example beef insulin, pork insulin, whale insulin and the like may be used. An illustrative starting material is crystalline bovine insulin (approximately 24 units/mg.), which is a standard item of commerce.

When the term "acyl-substituted" is used herein and in the appended claims it contemplates mono(acyl)substituted insulins in which one acyl radical is attached to each insulin amino group.

The conditions required for converting the N-chloroformyl derivative of Formula II to the instant acyl-substituted insulins of Formula I are not particularly critical. Thus, for example, it is convenient to use from about one-twentieth to about one-half parts by weight of II per part by weight of insulin (this provides a stoichiometric excess of the acylating agent, since the insulin macromolecule (tetramolecular complex) has an apparent or effective molecular weight of 24,000 at the pH of the reaction and each macromolecule (tetramolecular complex of this size contains twelve amino groups). The reaction occurs smoothly and completely at a pH of from about 7.5 to 8.5 in buffer, such as 0.1 M $K_2HPO_4$ and even at 0° C. While the acylating agent can be added all at once (initially), it is preferred to add it portionwise, at intervals of about 15 minutes, until all has been added. The product is isolated by dialyzing the reaction mixture against cold distilled water and freeze-drying (lyophilizing) the retentate to leave the product as a residue.

The N-chloroformyl-N-phenylglycine of Formula II can be prepared by techniques familiar to those skilled in the art. Reference is made, for example, to the procedure of Dvonch and Alburn, J. Org. Chem., 29, 3719 (1964).

The instant compounds can be administered in a variety of injectable dosage forms. As with insulin, the route of administration determines the duration and rapidity of action. Injections can be given aseptically by the subcutaneous route, although intravenous or intramuscular injections can be employed to insure rapid action. A convenient site of subcutaneous administration is the thigh.

The daily dose requirements vary with the particular composition being employed, the severity of symptoms being presented, and the animal(s), such as valuable domestic animals, or laboratory animals, such as mice, rats or monkeys, being treated. The dosage also varies with the size of the patient. Dosage is calculated on a unit basis in the same way as the dosage of crystalline zinc insulin. With a mammal of about 70 kilogram body weight, for example, the ordinarily effective dose is from about 1 to about 200 units per day. "Units" are U.S.P. insulin units. Of course, as in the case of insulin, each subject requires individual study to determine the most efficacious time, number, and amount of individual daily doses. As with insulin, blood sugar and urine sugar estimations provide a guide for therapy with the instant compositions, the therapeutic objective being to lower the blood sugar level to normal, then to maintain it.

For dosages, the instant compounds are formulated into a variety of sterile aqueous dosage forms containing various electrolytes, buffers, stabilizers and the like. Thus, for example, the sterile aqueous medium containing the instant compounds can also contain sodium chloride, sodium acetate, methyl para-hydroxybenzoate, glycerin, dibasic sodium phosphate, small, stabilizing amounts of phenol, meta-cresol and the like. An especially useful dosage unit form comprises 20, 40 or 80 units/ml. in sterilen physiological saline.

DESCRIPTION OF THE PREFERRED EMBODIMENTS

The following examples are intended to describe the new compounds of this invention and means to obtain them. They are merely illustrative and is not to be construed to limit the claims in any manner whatsoever.

EXAMPLE 1

N-phenylglycyl-insulin

One gram of crystalline zinc insulin of approximately 24 units/mg. activity is dissolved in 200 ml. of 0.1 M $K_2HPO_4$ by adjusting the pH to 10.0 and immediately back to 8.0. There is then added with stirring 60 mg. of N-chloroformyl-N-phenylglycine [prepared by reacting N-phenylglycine with phosgene in dioxane at 40° C. according to Dvonch and Alburn, J. Org. Chem., 29, 3719 (1964)]. After 15 minutes the pH is adjusted to 7.5 and three more 60 mg. additions of N-chloroformyl-N-phenylglycine are made at 15 minute intervals. Twenty minutes after the last addition, the reaction mixture is dialyzed against three 9-liter changes of cold distilled water. The retentate is lyophilized, giving 1.18 g. of product. The product activity is about 20.1 International Units/mg.

EXAMPLE 2

N-phenylglycyl-insulin (alternative procedure)

The procedure of Example 1 is repeated, substituting for the N-chloroformyl-N-phenylglycine, four 49 mg. batches of N-carboxy-N-phenylglycine anhydride. The product is obtained in comparable yield.

EXAMPLE 3

N-p-methylphenylglycyl-insulin

The procedure of Example 1 is repeated, substituting for the N-chloroformyl-N-phenylglycine a stoichiometrical amount of N-chloroformyl-N-p-methylphenylglycine. The product is obtained.

EXAMPLE 4

N-p-chlorophenylglycyl-insulin

The procedure of Example 1 is repeated substituting for the N-chloroformyl-N-phenylglycine a stoichiometrical amount of N-chloroformyl-N-p-chlorophenylglycine. The product is obtained.

In the preliminary evaluation of the hypoglycemic compounds of the invention, the in vitro and in vivo effects of the instant compounds were tested as follows:

The concentration dependent mitochondrial swelling activity of N-phenylglycyl-insulin was used as an index of its activity.

Rat liver mitochondria were prepared in 0.25 M sucrose solution containing 0.001 M ethylenediamine tetraacetic acid (EDTA) according to a standardized differential centrifugation procedure. The effect of the new insulins on mitochondrial swelling of freshly isolated rat liver mitochondria suspended in 0.125 M KCl—0.2 M tris (hydroxymethylamino) methane—0.1% partially hydrolyzed gelatin solution at pH 7.3 was measured by the following changes in light absorption at 520 mμ with a Beckman Model B Spectrophotometer. Reference is made to R. L. Fenichel, W. H. Bechmann and H. E. Alburn, Biochemistry, 5, 461 (1966). The results are summarized in Table I, below.

TABLE I.—MITOCHONDRIAL SWELLING ACTIVITY OF AMINOACYL-INSULINS

A. Concentration, 5×10⁻⁶ M—Δ O.D. spon. at 520 mμ

|  | 10′ | 20′ | 30′ | Total |
|---|---|---|---|---|
| N-phenylglycyl-insulin | 50 | 37 | 65 | 152 |

B. Concentration, 2.5×10⁻⁶ M—Δ O.D. spon. at 520 mμ

|  | 10′ | 20′ | 30′ | Total |
|---|---|---|---|---|
| N-phenylglycyl-insulin | 40 | 17 | 5 | 62 |

C. Concentration, 1.25×10⁻⁶ M—Δ O.D. spon. at 520 mμ

|  | 10′ | 20′ | 30′ | Total |
|---|---|---|---|---|
| N-phenylglycyl-insulin | 44 | 9 | −13 | 40 |

The data in Table I show that the instant compound has good concentration dependent activity.

In vivo testing of the new amino-acyl insulin was carried out as follows (Reference, H. E. Alburn and R. L. Fenichel, Nature 213, 515 (1967)):

After obtaining an initial 0.1 ml. blood sample from the hearts of lightly etherized male Sprague Dawley rats that had been fasted 18 hours for blood sugar analysis, the animals received by intraperitoneal injection different concentrations as units/kilogram body weight, of the instant N-phenylglycyl-substituted insulin. Additional 0.1 ml. blood samples were obtained from the hearts of these animals at regular time intervals for blood sugar analysis. It was found that after administration of 1.25 units/kg. of body weight, the mean glucose value, which was 72 mg.-percent at zero time, fell to 60 mg.-percent at 30 minutes and to 47 mg.-percent at 90 minutes; and after administration of 2.5 units/kg., the mean glucose value, which was 65 mg.-percent at zero time, fell to 43 mg.-percent at 30 minutes, to 35 mg.-percent at 90 minutes and to 33 mg.-percent at 150 minutes. Thus N-phenylglycyl insulin was found to lower blood sugar significantly on a dose response basis.

In addition, N-phenylglycyl-insulin was tested by immunoassay, rat diaphragm and fat pad assays. This insulin was found to be significantly less antigenic than pure pork insulin in the immunoassay, and it was active in the fat pad assays.

In an immunoassay of the instant insulins according to the two antibody system of C. R. Morgan and A. Lazarow, Diabetes, 12, 115–126 (1963), the percent recovery of N-phenylglycyl insulin was 33 in comparison with 100 for a pork insulin standard and 137 for beef zinc insulin. This shows the antibody-binding capacity of the instant modified insulin is very much lower than standard beef insulin and substantially less than that of pork insulin which is the insulin of choice now for administration to insulin fast diabetics.

What is claimed is:

1. An acyl-substituted insulin compound of the formula

Acyl—NH—Insulin wherein said acyl is of the formula:

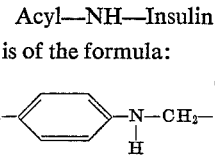

wherein R is selected from the group consisting of hydrogen, methyl or chloro and NH represents the residue of a free amino group of insulin and wherein substantially all of the free amino groups of insulin are substituted by acyl groups.

2. The compound of claim 1 wherein R is hydrogen.

References Cited

UNITED STATES PATENTS

| 3,481,917 | 12/1969 | Grant et al. | 260—112.7 |
| 3,509,120 | 4/1970 | Bodanszky et al. | 260—112.7 |
| 3,268,519 | 8/1966 | Alburn et al. | 260—239.1 |

FOREIGN REFERENCES

| 482,519 | 4/1952 | Canada | 260—112.7 |

OTHER REFERENCES

Bromer et al., Biochemistry (Wash.) 6, 2378–2388 (1967).

Levy et al. I, J. Am. Chem. Soc. 88, 3676–3677 (1966).

Levy et al. II, Biochemistry (Wash.) 6, 3559–3568 (1967).

LEWIS GOTTS, Primary Examiner

M. M. KASSENOFF, Assistant Examiner

U.S. Cl. X.R.

424—178; 260—518A, R